United States Patent
Heinrich et al.

(10) Patent No.: US 11,131,229 B2
(45) Date of Patent: Sep. 28, 2021

(54) METHOD FOR PRODUCING A HONEYCOMB BODY

(71) Applicant: CPT Group GMBH, Hannover (DE)

(72) Inventors: Rainer Heinrich, Leverkusen (DE); Alexander Scholz, Bonn (DE); Lukas Hort, Bergisch Gladbach (DE)

(73) Assignee: Vitesco Technologies GmbH, Hannover (DE)

( * ) Notice: Subject to any disclaimer, the term of this patent is extended or adjusted under 35 U.S.C. 154(b) by 93 days.

(21) Appl. No.: 16/579,081

(22) Filed: Sep. 23, 2019

(65) Prior Publication Data

US 2020/0018211 A1 Jan. 16, 2020

Related U.S. Application Data

(63) Continuation of application No. PCT/EP2018/056694, filed on Mar. 16, 2018.

(30) Foreign Application Priority Data

Mar. 27, 2017 (DE) .................... 10 2017 205 147.7

(51) Int. Cl.
 *F01N 3/28* (2006.01)
 *B01D 53/94* (2006.01)

(52) U.S. Cl.
 CPC .......... *F01N 3/2814* (2013.01); *B01D 53/94* (2013.01); *F01N 3/281* (2013.01); *F01N 3/2817* (2013.01);
 (Continued)

(58) Field of Classification Search
 CPC ......... Y10T 29/49345; Y10T 29/49366; F01N 2450/00; F01N 2330/04; B23P 15/26
 See application file for complete search history.

(56) References Cited

U.S. PATENT DOCUMENTS

| 4,221,843 A | 9/1980 | Mundy | |
|---|---|---|---|
| 4,318,888 A * | 3/1982 | Chapman | B01D 53/86 29/890 |

(Continued)

FOREIGN PATENT DOCUMENTS

| CN | 1090623 A | 8/1994 |
|---|---|---|
| CN | 1307173 A | 8/2001 |

(Continued)

OTHER PUBLICATIONS

Korean Office Action dated Dec. 28, 2020 for corresponding German Patent Application No. 10-2019-7028746.

(Continued)

*Primary Examiner* — Jason L Vaughan (57) ABSTRACT

A method for producing a honeycomb body for a catalytic converter for treating exhaust gases, the honeycomb body having a plurality of flow ducts, through which gas flows from an inlet end to an outlet end. The honeycomb body is formed from a plurality of metal layers lying one on top of the other. The honeycomb body is produced by forming corrugated sections in a metal strip, wherein the corrugated sections follow one another directly or are spaced apart by smooth sections, creating a pre-bend of the metal strip in the end region of each section, folding the individual sections of the metal strip onto one another to create a layer stack, wherein the individual sections are alternately folded onto one another in opposite directions, inserting the layer stack in a housing, and joining the layer stack to the housing in contact regions between the layer stack and the housing.

23 Claims, 6 Drawing Sheets

(52) U.S. Cl.
CPC ........ *F01N 3/2839* (2013.01); *B23P 2700/03* (2013.01); *F01N 2330/04* (2013.01); *F01N 2330/30* (2013.01); *F01N 2330/32* (2013.01); *F01N 2330/40* (2013.01); *F01N 2330/44* (2013.01); *F01N 2450/00* (2013.01); *Y10T 29/49345* (2015.01)

(56) References Cited

U.S. PATENT DOCUMENTS

| | | | | |
|---|---|---|---|---|
| 4,567,630 | A | * | 2/1986 | Ishida ............... B01J 35/02 29/527.4 |
| 4,647,435 | A | | 3/1987 | Nonnenmann |
| 4,711,009 | A | * | 12/1987 | Cornelison ......... F01N 3/2814 29/890 |
| 4,719,680 | A | * | 1/1988 | Cyron ................ F01N 3/281 29/890 |
| 4,782,570 | A | * | 11/1988 | Spridco ............... B21C 37/151 29/890 |
| 4,847,966 | A | * | 7/1989 | Kuchelmeister ....... B01J 35/04 29/890 |
| 5,302,355 | A | * | 4/1994 | Fujikura .............. F01N 3/281 422/180 |
| 5,402,928 | A | * | 4/1995 | Preston ............... B01J 35/04 228/181 |
| 5,557,847 | A | | 9/1996 | Koshiba |
| 5,737,839 | A | * | 4/1998 | Whittenberger ....... B01J 35/04 29/890 |
| 6,049,961 | A | | 4/2000 | Wieres |
| 6,207,116 | B1 | | 3/2001 | Heed ................ F01N 13/0097 422/173 |
| 6,389,693 | B1 | * | 5/2002 | Aranda ............. B01D 53/9454 29/890 |
| 6,807,723 | B2 | * | 10/2004 | Park .................. B21C 51/00 29/709 |
| 7,197,822 | B2 | * | 4/2007 | Voit .................. B23K 1/0014 29/890 |
| 7,690,113 | B2 | * | 4/2010 | Althofer ............. B23K 1/0014 29/890.039 |
| 8,617,040 | B2 | | 12/2013 | Coenen et al. |
| 9,073,110 | B2 | * | 7/2015 | Kaneda ............... B21D 13/04 |
| 2002/0053187 | A1 | | 5/2002 | OConnor |
| 2008/0199654 | A1 | | 8/2008 | Zaldua-Moreno |
| 2010/0024967 | A1 | | 2/2010 | Gritti |
| 2014/0010723 | A1 | * | 1/2014 | Yagi ................... F01N 3/2835 422/180 |

FOREIGN PATENT DOCUMENTS

| | | |
|---|---|---|
| CN | 1359768 A | 7/2002 |
| CN | 1784299 A | 6/2006 |
| CN | 101262946 A | 9/2008 |
| DE | 19646242 A1 | 5/1998 |
| DE | 102004058590 A1 | 5/2002 |
| DE | 102005043196 A1 | 3/2007 |
| DE | 69932398 T2 | 7/2007 |
| EP | 0106480 A2 | 4/1984 |
| EP | 0151229 A1 | 8/1985 |
| JP | S60115332 A | 6/1985 |
| JP | 4199311 B2 | 12/2008 |
| JP | 2009136776 A | 6/2009 |
| JP | 2010509045 | 3/2010 |
| RU | 2574483 | 11/2011 |
| WO | 2005038203 A1 | 4/2005 |

OTHER PUBLICATIONS

ChineseOffice Action dated Dec. 10, 2020 for corresponding German Patent Application No. 201880016067.0.

International Search Report and Written Opinion dated XX from corresponding International Patent Application No. PCT/EP2018/056694.

German Office Action dated Aug. 14, 2018 for corresponding German Patent Application No. 10 2017 205 147.7.

German Office Action dated Mar. 3, 218 for corresponding German Patent Application No. 10 2017 205 147.7.

Russian Office Action dated Jul. 5, 2021 for corresponding Russian Patent Application No. 2019128414/12.

* cited by examiner

METHOD FOR PRODUCING A HONEYCOMB BODY

CROSS-REFERENCE TO RELATED APPLICATIONS

This application claims the benefit of PCT Application PCT/EP2018/056694, filed Mar. 16, 2018, which claims priority to German Patent Application 10 2017 205 147.7, filed Mar. 27, 2017. The disclosures of the above applications are incorporated herein by reference.

FIELD OF THE INVENTION

The invention relates to a method for producing a honeycomb body for a catalytic converter or reformer for treating gases, e.g. exhaust gases from an internal combustion engine or in inlet and exhaust air systems in industry, wherein the honeycomb body has a plurality of flow ducts, through which gas may flow from an inlet end to an outlet end, wherein the honeycomb body is formed from a plurality of metal layers lying one on top of the other.

BACKGROUND OF THE INVENTION

Catalytic converters, which are used to treat exhaust gases from an internal combustion engine for example, are produced in a large number of different forms for specific uses. The most common forms of construction in this context are formed by catalytic converters with round or oval cross sections. The honeycomb bodies within these catalytic converters are produced by winding up a previously produced layer stack for example, wherein the layer stack has alternate corrugated and smooth layers, for example, between which flow ducts are formed.

Moreover, the prior art also includes catalytic converters which have an angular construction. These include, in particular, catalytic converters with a square, trapezoidal or polygonal cross section. Polygonal cross sections may be taken to mean hexagons or octagons, for example. The honeycomb bodies within these catalytic converters are often likewise formed by wound layer stacks or by cut layers stacked one on top of the other.

The disadvantage with the devices in the prior art is, in particular, that honeycomb bodies produced by winding may be adapted only very inadequately to an angular shape of the housing accommodating the honeycomb body. Locations which cannot be filled by the honeycomb body are formed especially in the corner regions. Moreover, the contact between the metal layers forming the honeycomb body and the jacket tube or housing is not optimal, which is disadvantageous in particular as regards subsequent brazing. The durability of the honeycomb bodies produced is thereby furthermore negatively affected. The same applies to honeycomb bodies which are produced from cut layers stacked one on top of the other.

SUMMARY OF THE INVENTION

It is therefore the object of the present invention to provide a method which enables angular catalytic converters to be produced which have a honeycomb body optimally matched to the cross section of the jacket tube or housing.

The object relating to the method is solved by a method described below.

The method according to the invention for producing a catalytic converter for treating exhaust gases from an internal combustion engine is described in greater detail below. As already mentioned at the outset, honeycomb bodies produced by the method may also be used for treating gases in industrial plants. The honeycomb bodies are employed as catalytic converters or as reformers. The focus in the description on catalytic converters for treating exhaust gases from an internal combustion engine is not of a restrictive nature.

An exemplary embodiment of the invention relates to a method for producing a honeycomb body for a catalytic converter for treating exhaust gases, wherein the honeycomb body has a plurality of flow ducts, through which gas may flow from an inlet end to an outlet end, wherein the honeycomb body is formed from a plurality of metal layers lying one on top of the other, wherein the method has the following steps:

forming corrugated sections in a metal strip, wherein the corrugated sections follow one another directly or are spaced apart by smooth sections, creating a pre-bend of the metal strip in the end region of each section, folding the individual sections of the metal strip onto one another to create a layer stack, wherein the individual sections are alternately folded onto one another in opposite directions, inserting the layer stack in a housing, and joining, by bonding or mechanical means, the layer stack to the housing in contact regions between the layer stack and the housing.

A honeycomb body produced by the method is particularly advantageous since the individual layers of the layer stack are not formed from a plurality of individual elements but are formed from a single metal strip, which forms the layer stack through the folding of individual sections of the metal strip onto one another. The honeycomb body may thus be produced more easily and has a higher strength since all the layers each have at least a permanent connection to the respective adjacent layers.

The method is carried out in a particularly advantageous manner by a production machine which, in addition to the required forming of the corrugation, also performs pre-bending of the metal strip. The pre-bend is necessary in order to simplify the selective folding of the individual sections onto one another. For this purpose, individual sections are selectively set to an angle of incidence relative to the main feed direction of the metal strip by bending, thereby making it easier to fold them onto one another. The procedure is preferably always carried out in an alternating manner such that one section is deflected to the right out of the main feed direction and then one section is deflected to the left out of the main feed direction.

Through the subsequent folding of the sections onto one another to form a honeycomb body, which ultimately consists of sections folded onto one another in the manner of an accordion, a honeycomb body is produced. The flow ducts, through which an exhaust gas may flow, are formed between the mutually adjoining layers.

It is particularly advantageous if the layer stack is produced in a holding device by folding the sections into the holding device.

A holding device is, for example, a housing which has an opening through which the sections of the metal strip are folded onto one another and introduced into the housing. The housing or holding device preferably has an internal volume which corresponds approximately to the honeycomb body to be produced, with the result that the honeycomb body folded into the holding device completely fills the internal volume of the holding device. To produce cuboidal honeycomb bodies, the holding device preferably has a likewise cuboidal shape, which has an opening on one side through which the sections of the metal strip may be guided.

The holding device is advantageous, in particular, since the spatial limitation of the space into which the sections of the metal strip are folded prevents the individual layers from slipping relative to one another.

It is also advantageous if the sections are folded into the holding device by lever elements, which are rotatably mounted on opposite sides of the holding device.

The lever elements are used to bend over the pre-bent sections of the metal strip further and, finally, to fold them completely onto one another, thus producing a layer stack of metal layers lying parallel to one another. In this case, the lever elements could advantageously be designed like flaps which may close the opening of the holding device through which the metal strip is guided. The lever elements are preferably actuated cyclically in accordance with the feed rate of the metal strip, thus ensuring that in all cases a section of the metal strip which is precisely long enough to form the respective layer is bent over.

In an advantageous embodiment, the metal strip may have formed features into which the lever elements may selectively engage in order to ensure reliable guidance and folding of the sections of the metal strip.

One preferred exemplary embodiment is characterized in that the lever elements are pulled laterally out of the layer stack after the respective next layer has been produced by folding in the respectively following section of the metal strip.

On the one hand, the lever elements serve to fold in the sections of the metal strip. On the other hand, the lever elements also serve to fix the already folded-in sections of the metal strip to one another to ensure that the folding does not come undone again. The respective lever element thus remains in the folded-up layer stack until the respective next layer has been folded in and the second lever element fixes the layer stack.

The respective first lever element is then pulled laterally out of the layer stack. It is then repositioned in its initial position so that the next section may subsequently be folded onto the layer stack. This process is repeated until the layer stack is sufficiently large.

There is also a preference for the lever elements to produce a movement along the main feed direction of the metal strip, as a result of which the layer stack produced is fed into the holding device.

In addition to the actual folding process, the lever elements may also ensure the feed motion of the folded-on sections into the holding device. For this purpose, it is also possible, in addition to the rotatable mounting, for the lever elements to be movable along the main feed direction of the metal strip and/or transversely to the direction.

Moreover, it is advantageous if the sections are folded against a plate arranged in the holding device, wherein the plate is acted upon by a preloading force opposite to the main feed direction of the metal strip.

In this case, the plate may advantageously serve as an abutment, against which the sections of the metal strip are folded. To produce the preloading force, the plate is subjected to a spring force acting counter to the main feed direction of the metal strip, for example. This requires that the plate which is movably mounted within the holding device be positioned in the region of the holding device which has the opening at the start of the respective folding process. With an increasing number of sections folded onto one another, the plate is pushed away from the opening by the forming layer stack, wherein it exerts a force opposed to the movement on the layer stack, thereby ensuring that the individual layers rest firmly against one another.

After the honeycomb body has then been produced in the holding device, the plate may also be used to push the layers that have been folded onto one another out of the holding device in order to insert the honeycomb body into its housing, for example.

It is furthermore advantageous if the lever elements are movable along the main feed direction of the metal strip and/or transversely to the direction. By means of the movement along the main feed direction, it is possible to achieve the follow-on movement of the folded sections into the holding device, making the process simpler and more reliable. The movement of the lever elements transversely to the main feed direction enables the lever elements to be pulled back out of the layer stack after the respective folding process without damaging the layer stack or otherwise exerting a negative effect thereon at the same time. It is particularly advantageous if the folding movement of the lever elements and the movement transversely to the main feed direction are coordinated with the feed motion of the metal strip, thus ensuring that the process may take place as quickly and in as automated a way as possible in order to maximize the output rate.

It is also expedient if the metal strip to be processed is an endless metal strip or is at least sufficiently long to enable at least one complete honeycomb body to be formed in one piece. This is advantageous in order in each case to obtain a honeycomb body which is formed without a butt joint or joint. This increases the stability of the honeycomb body and thus also long-term durability.

It is furthermore advantageous if the metal strip is first of all corrugated, at least in some sections, in directly successive steps, then pre-bent and/or cut to length and, finally, folded onto one another around the pre-bent location to form a layer stack. This is advantageous in order to keep the process as compact as possible and to ensure production which is as far as possible automated.

It is furthermore expedient if the corrugations are rolled into the metal strip by profiled rolls or are produced by rams that are driven into the metal strip.

It is also preferable if the sections of the metal strip are folded onto one another in opposite directions in the manner of an accordion transversely to the main feed direction of the metal strip. In this way, it is possible, in particular, to obtain a compact honeycomb body which is produced exclusively by the folding of the individual sections onto one another. There is no need here for further mechanical processing of the kind which is necessary with conventional wound honeycomb bodies.

It is furthermore advantageous if the holding device is rotatably mounted, and the sections of the metal strip are folded onto one another in the manner of an accordion transversely to the main feed direction of the metal strip by turning the holding device.

A rotatable holding device makes it possible to dispense with lever elements for folding. The metal strip, which likewise has a pre-bend at the end of the individual sections, is folded in such a way by rotating the holding device that the individual sections come to rest on one another and a layer stack is produced.

The holding device is preferably mounted in such a way as to be rotatable about an axis rotated through 90 degrees relative to the main feed direction. Turning the holding device through approximately 90 degrees clockwise or counterclockwise enables the metal strip to be bent and folded once, as a result of which it comes to rest against the plate within the holding device. For this purpose, it is also possible for the metal strip to be connected temporarily to the holding device at at least one location in order to ensure that the first layer of the layer stack does not slip.

For the next folding process, the holding device is turned through 180 degrees counter to the first direction of rotation, as a result of which the metal strip is folded in the opposite direction and the next section comes to rest on the already folded layer. This process is repeated as often as required until the layer stack thus formed has a sufficient number of layers.

It is furthermore expedient if the sections of the metal strip are folded onto one another in the manner of an accordion by alternate turning of the holding device.

It is also advantageous if the respective layer last formed by a folded-on section is fixed at least temporarily by a holding plate on the side facing away from the holding device.

A holding plate is advantageous to prevent sections that have already been folded to form the layer stack coming loose again or moving relative to one another during the rotary motion.

It is furthermore advantageous if the holding plate is in each case removed from the layer stack when the holding device has been turned again and a further layer has thus been produced by a section newly folded on in the opposite direction and this newly folded-on layer has been fixed at least temporarily by a second holding plate. Removing the holding plate ensures that only the layers produced from the metal strip are contained in the finished layer stack.

It is also preferable if the sections of the metal strip are folded into a holding device by the feed motion of the metal strip until a predetermined number of sections has been folded onto one another in the holding device, wherein the layer stack thus formed is compressed by a compression element moved along the main feed direction.

It is furthermore advantageous if a shaped element is placed in the folding region produced between two directly adjacent sections by folding the sections onto one another the shaped element imparting to the folding region, during the compression of the layer stack, a shape predeterminable by the shaped element.

It is furthermore expedient if guide elements are introduced into the folding region produced by the folding between directly adjacent sections, the guide elements being movable along the main feed direction and serving to guide the individual sections folded onto one another in the holding device.

Moreover, it is advantageous if the respective first and the respective last section of the metal strip are of smooth design and each have a region which has an extent like the other sections and in each case have an additional region, which has an additional extent beyond the length of the other sections, wherein these additional regions are folded into the holding device in such a way that the additional regions rest against the inner surfaces of the holding device along the main feed direction and space apart the layer stack produced at least partially from the holding device.

Advantageous developments of the present invention are described in the dependent claims and in the following description of the Figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail in the following text on the basis of exemplary embodiments with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
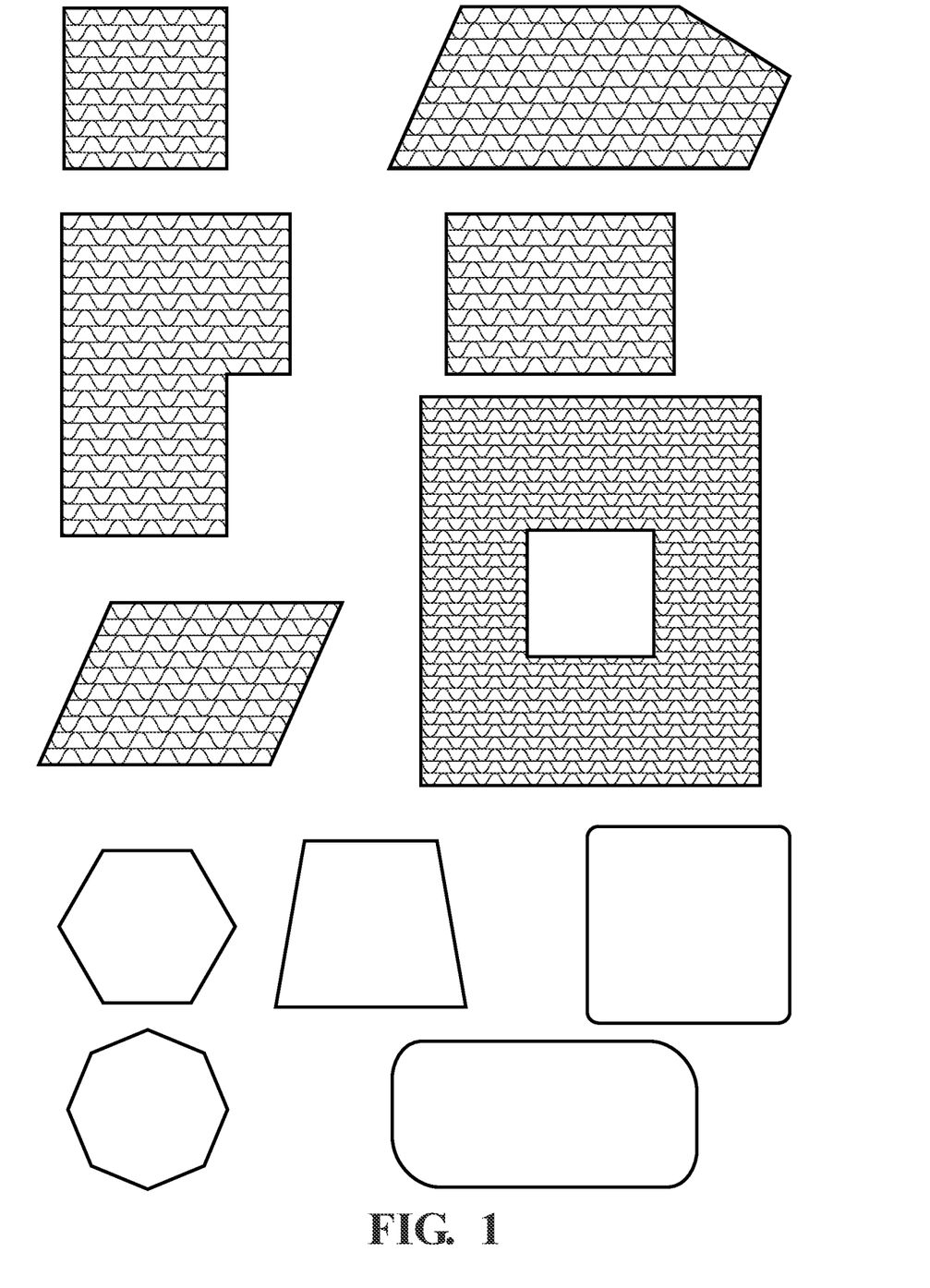
FIG. 1 shows a view of a plurality of possible cross sections for the honeycomb body to be produced and the housings that are used.

FIG. 1 shows a plurality of honeycomb bodies enclosed in housings, of the kind which may advantageously be produced by the method according to the invention. In particular, the FIG. 1 shows honeycomb bodies with an angular cross section since these are particularly easy to produce by folding up the layers comprising sections of an endless metal strip. In addition to square and rectangular cross sections, trapezoidal, I-shaped or other angled cross sections may also be produced. The corners of the cross sections may also be rounded, and this is achieved in a particularly advantageous manner by corresponding folding of the individual sections.

Moreover, cross sections are represented by different housings in the lower part of FIG. 1. The honeycomb bodies produced by the method according to the invention may advantageously be inserted into such housings in order to create a dimensionally stable honeycomb body.

The honeycomb bodies illustrated in FIG. 1 are exemplary, and are not of a limiting nature.

FIGS. 2A-2F show a number of images, each showing individual process steps of a method for producing a honeycomb body. The individual process steps are denoted by successive numbers 1 to 6.

Figure 2A:
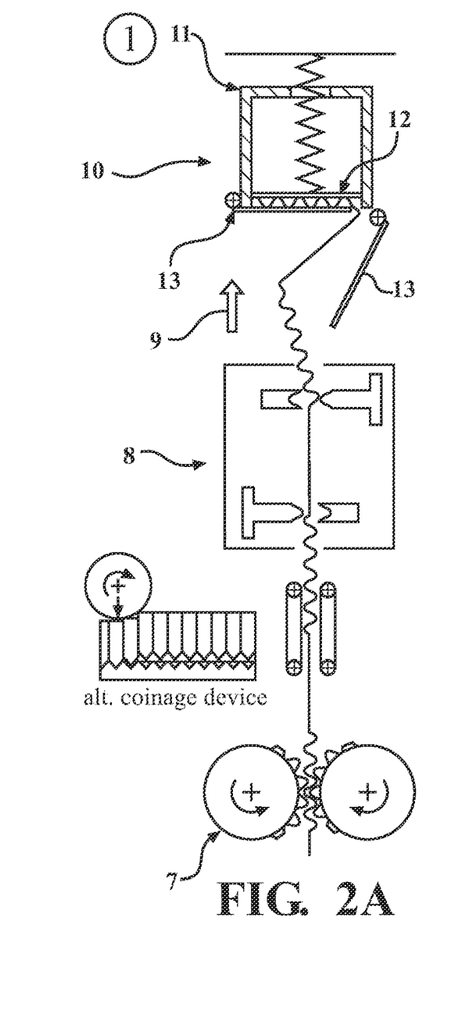
FIG. 2A shows a first process step of a process for producing a honeycomb body, wherein the layer stack is formed by alternate folding of the sections of a metal strip in the manner of an accordion.

Section 1 of FIG. 2A shows a schematic view of a device for producing a honeycomb body from an endless metal strip. The metal strip is preferably processed directly from a coil, thereby ensuring a continuous process sequence.

Reference sign 7 denotes two rolls, which are at least partially profiled in the circumferential direction and are arranged at a defined spacing from one another. The metal strip is passed through the gap between the two rolls 7 and a corrugated structure is simultaneously produced in the metal strip by the rotation of the rolls 7. In the exemplary embodiment in FIGS. 2A-2F, only corrugated subsections are produced in each case in the metal strip, these being interrupted in each case by smooth uncorrugated sections.

Following on from this, the at least partially profiled metal strip is passed through a device 8, in which, on the one hand, the metal strip may be cut off if, for example, a sufficiently long section of the metal strip has been delivered. On the other hand, it is also possible for the metal strip to undergo a pre-bend in the device 8, it being possible for this to be produced by a suitable ram.

Pre-bending the metal strip is advantageous since successive sections of the metal strip are folded onto one another in the manner of an accordion in the following step in order in this way to produce the layer stack of the honeycomb body. In the exemplary embodiment in FIGS. 2A-F, a corrugated section in each case follows a smooth section of the metal strip. The finished layer stack thus has alternating layers of smooth and corrugated sections. The pre-bend is therefore advantageously produced in the device 8 in such a way that the sections are folded onto one another alternately in opposite directions from right to left and from left to right. For this purpose, the metal strip is alternately bent out of the main feed direction 9 to the left and to the right.

Device 8 is followed by device 10, which is formed by a holding device 11, a plate 12 and two lever elements 13.

The holding device 11 serves to receive the sections of the metal strip which have been folded onto one another in order to prevent slipping of the sections relative to one another and thus destruction of the layer stack itself.

Illustrated in the holding device is a plate 12, which extends transversely to the main feed direction 9 and serves as an abutment for the first folded-in section of the metal strip and ultimately for the entire layer stack. The plate 12 is subjected to a preloading force opposed to the main feed direction 9, as a result of which a force counter to the main feed direction 9 is exerted on the layer stack. In conjunction with the continued supply of the metal strip and the force components caused thereby along the main feed direction 9, reliable fixing of the layer stack on and in the holding device 11 is thus produced.

Two lever elements 13 are arranged at opposite end regions of the opening at the lower end of the holding device 11. These are rotatably mounted and are rotated from a position in which they are aligned parallel to the main feed direction 9 into a position in which they are angled at 90 degrees and substantially close the lower opening of the holding device 11.

The lever elements 13 are intended to selectively fold in the individual sections of the metal strip in order to produce the layer stack. For this purpose, the left-hand and the right-hand lever element 13 are alternately swung in, thereby simultaneously folding in the metal strip in corresponding fashion. In the exemplary embodiment in FIGS. 2A-2F, the smooth uncorrugated sections are in all cases folded in to the left by the right-hand lever element 13, while the corrugated sections are folded in from left to right by the left-hand lever element 13, for example.

Once both lever elements 13 have folded in a section, the respective lever element 13, which continues to rest against the holding device 11 further up or further along the main feed direction 9, is pulled laterally out of the layer stack in order then to fold a new section of the metal strip onto the layer stack.

By swinging the lever elements 13 in and by moving the lever elements 13 in translation, it is also additionally possible to produce a feed motion of the layer stack into the holding device 11. It is also possible to produce a holding force which fixes the layer stack securely on the plate 12.

For this purpose, it is particularly advantageous if the lever elements 13 are movable both along the main feed direction 9 and transversely to the direction.

Figures 2B, 2C, 2D:
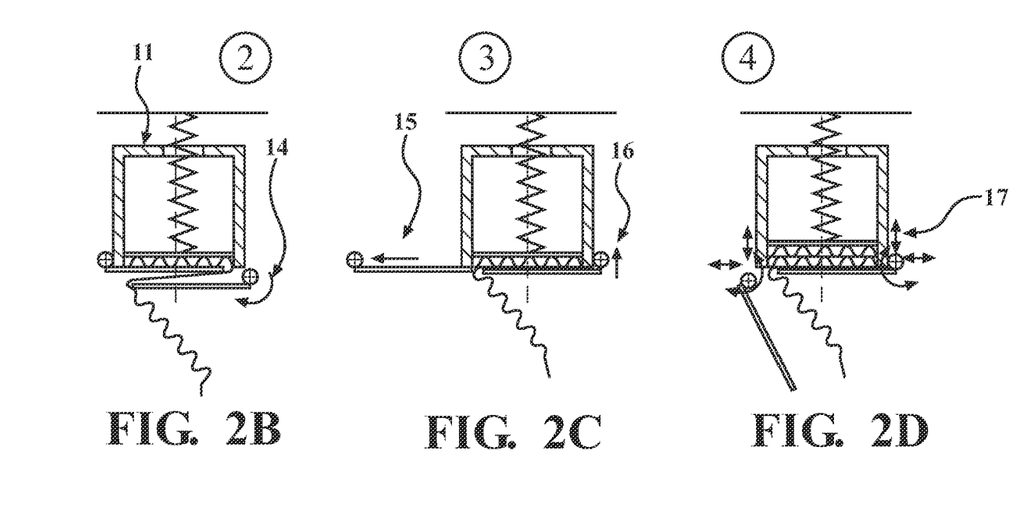
FIG. 2B shows a second process step of a process for producing a honeycomb body, wherein the layer stack is formed by alternate folding of the sections of a metal strip in the manner of an accordion.
FIG. 2C shows a third process step of a process for producing a honeycomb body, wherein the layer stack is formed by alternate folding of the sections of a metal strip in the manner of an accordion.
FIG. 2D shows a fourth process step of a process for producing a honeycomb body, wherein the layer stack is formed by alternate folding of the sections of a metal strip in the manner of an accordion.

The number 2 indicates a detail view of the holding device 11. The inward-swinging direction of the right-hand lever element 13 is illustrated by the arrow 14.

The number 3 indicates another detail view of the holding device 11. This view illustrates how the left-hand lever element 13 is pulled out of the layer stack produced to the left, transversely to the main feed direction 9, after the right-hand lever element 13 has folded in the next section of the metal strip and fixed the layer stack relative to the plate 12. The movements of the lever elements 13 are indicated by the arrows 15 and 16.

The number 4 indicates the following next process step. The various double arrows 17 illustrate the different degrees of freedom of the lever elements 13. In the process step indicated by the number 4, the repeated folding-in of a section by the left-hand lever element 13 is illustrated. In the various illustrations indicated by number 2 to number 4, it is seen how the layer stack produced in the holding device 11 becomes ever larger since more and more sections of the metal strip are folded onto the stack.

Figure 2E:
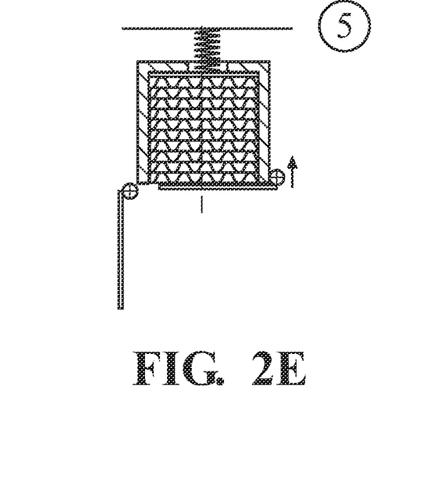
FIG. 2E shows a fifth process step of a process for producing a honeycomb body, wherein the layer stack is formed by alternate folding of the sections of a metal strip in the manner of an accordion.

Finally, the number 5 indicates the process step in which the layer stack has reached its final size. Through the repeated folding of the alternately corrugated and smooth sections of the metal strip onto one another, a layer stack has formed, comprising alternating layers of corrugated and smooth sections. The layer stack fills the entire interior of the holding device 11. In the view indicated by the number 5, the layer stack is fixed in the holding device 11 by one of the lever elements 13, thereby ensuring that the layer stack of the honeycomb body does not unfold again before it is finally inserted into a housing.

Figure 2F:
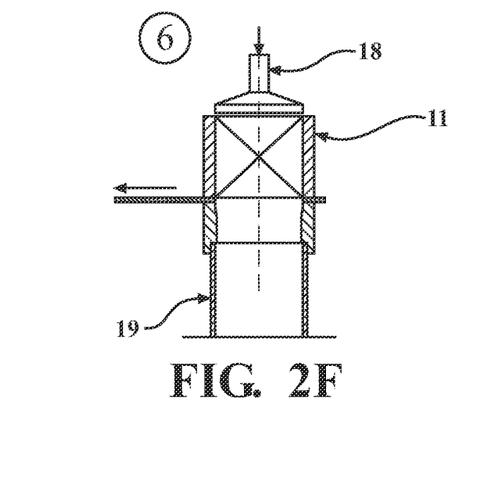
FIG. 2F shows a sixth process step of a process for producing a honeycomb body, wherein the layer stack is formed by alternate folding of the sections of a metal strip in the manner of an accordion.

The number 6 indicates the last process step. The layer stack in the holding device 11 is pushed out of the holding device 11 and into a housing 19 by means of a ram 18. The housing 19 is preferably formed by a tube. In this case, the layer stack is positioned relative to the tube in such a way that the flow ducts formed in the layer stack run along the central axis of the tube. For this purpose, the holding device 11 may have walls that are removed to enable the layer stack to be pushed out of the holding device 11 in any desired direction.

As a particular preference, the abovementioned process steps are carried out successively in an automated manner by a machine or a pool of machines. The tube 19 used for the catalytic converter is matched to the layer stack produced in the holding device 11 and to the holding device 11 itself in order to produce a layer stack which is inserted with an accurate fit into the tube 19.

FIGS. 3A-3E show a view of 5 alternative process steps, denoted by the numbers 20 to 24.

The process steps indicated by the numbers 20 to 24 show a process which likewise produces a honeycomb body folded up from an endless metal strip in a holding device 25. In contrast to the process steps in FIGS. 2A-2F, the individual sections of the metal strip in the process in FIGS. 3A-3E are folded onto one another not by lever elements but by a rotary motion of the holding device 25.

The metal strip is likewise profiled by means of rolls, which are not shown in FIGS. 3A-3E. In the example in FIGS. 3A-3E, the metal strip is entirely profiled, and therefore there is no alternation between corrugated and smooth sections. The metal strip is likewise pre-bent by a device 26, thereby simplifying the folding up of the sections.

Figure 3A:
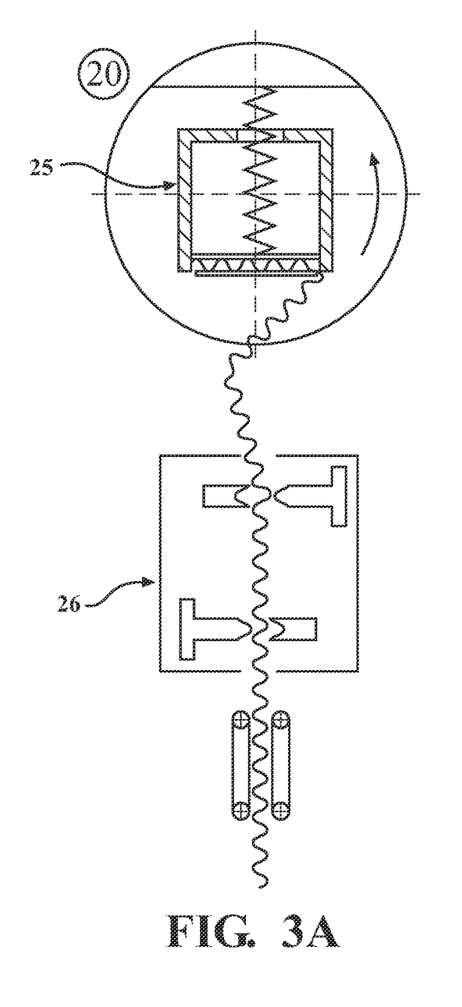
FIG. 3A shows a first process step of an alternative process for producing a honeycomb body, wherein the folding of the individual layers onto one another is produced by turning the holding device relative to the main feed direction of the metal strip.

The first section of the metal strip is introduced into the holding device 25 and is preferably fixed at least temporarily on the holding device 25. In this case, the first layer of the layer stack is produced in a position in which the opening of the holding device 25 faces downward, thus enabling the metal strip to be fed into the holding device 25 along the main feed direction.

Figure 3B:
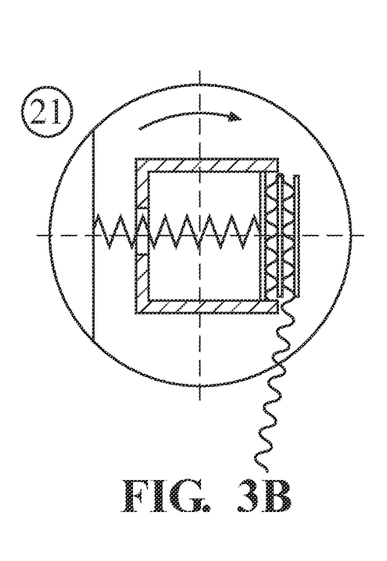
FIG. 3B shows a second process step of an alternative process for producing a honeycomb body, wherein the folding of the individual layers onto one another is produced by turning the holding device relative to the main feed direction of the metal strip.

To produce the second layer, the holding device is turned counterclockwise through 90 degrees, as a result of which it is then aligned with the opening to the right, as shown in number 21. The metal strip is thereby folded onto the first layer of the layer stack. The layer produced in this way is advantageously fixed temporarily by a holding plate, thereby likewise enabling the layer stack produced to be fed further into the holding device 25.

Figure 3C:
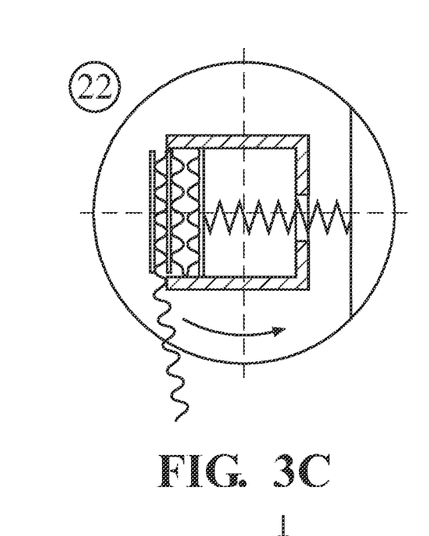
FIG. 3C shows a third process step of an alternative process for producing a honeycomb body, wherein the folding of the individual layers onto one another is produced by turning the holding device relative to the main feed direction of the metal strip.

The holding device 25 is then rotated clockwise through 180 degrees. At the end of the movement, the opening of the holding device 25 faces to the left and a third layer is folded onto the layer stack. Once again, a holding plate is placed on in order to fix the layer stack. The previously placed holding plate from step 21 may then be pulled out of the layer stack.

Figure 3D:
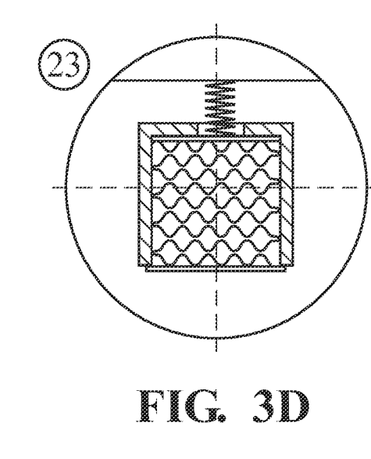
FIG. 3D shows a fourth process step of an alternative process for producing a honeycomb body, wherein the folding of the individual layers onto one another is produced by turning the holding device relative to the main feed direction of the metal strip.
Figure 3E:
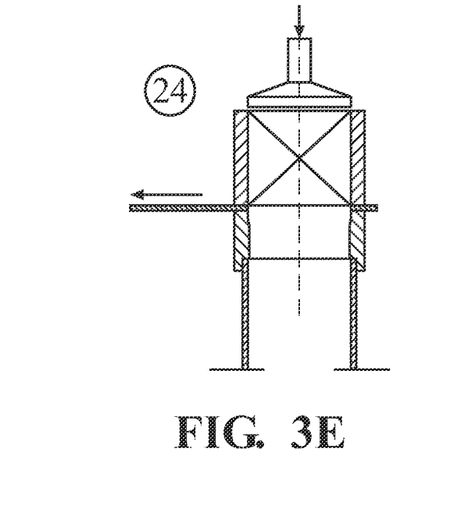
FIG. 3E shows a fifth process step of an alternative process for producing a honeycomb body, wherein the folding of the individual layers onto one another is produced by turning the holding device relative to the main feed direction of the metal strip.

This process is repeated until a sufficient number of layers has been produced in the layer stack and fed into the holding device 25. In process step 24, the honeycomb body produced in this way is pushed into a tube acting as a housing, in a manner similar to process step 6. Finally, the honeycomb body is fixed in the housing or tube by a subsequent brazing process.

The processes in FIGS. 2A-2F and FIGS. 3A-3E are alternatives to one another and both deliver a result which lies within the scope of the present invention. The main difference between the two processes is the manner in which the individual sections are folded to give the layer stack. Individual features of the processes may also be combined with one another.

FIGS. 4A-4E show process steps 30 to 34, which illustrate an alternative method. In step 30, as before, a metal strip with alternate corrugated and uncorrugated sections is folded into a holding device 35, with the result that the sections come to rest on one another in the manner of an accordion. In contrast to the previous methods, the metal strip in the example in FIGS. 4A-4E is fed into the holding device 35 loosely by the feed motion of the metal strip rather than forcibly by lever elements. Under some circumstances, the individual sections are therefore also not folded completely onto one another, with the result that they come to rest fully on one another.

Figure 4A:
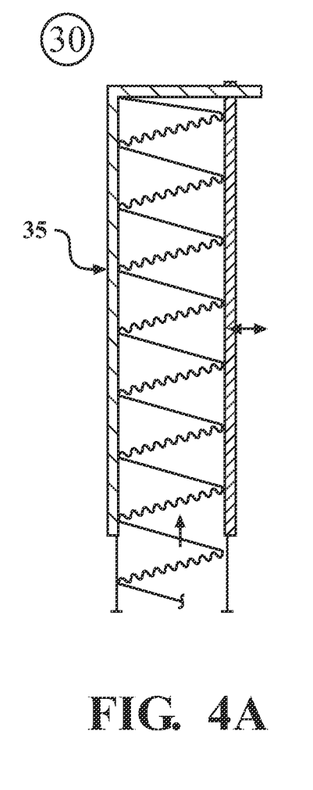
FIG. 4A shows a first process step of a process for producing a layer stack inserted into a housing, wherein the layer stack folded loosely into the holding device is compressed by a compression element.
Figure 4B:
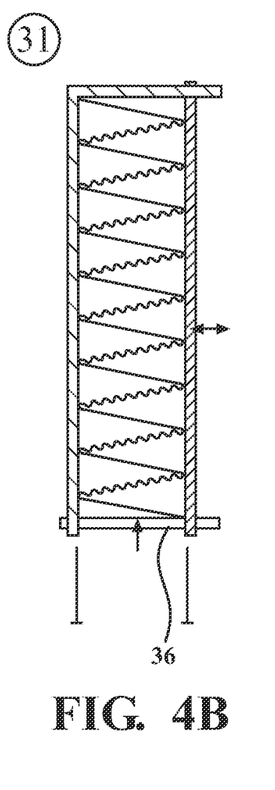
FIG. 4B is a second process step of a process for producing a layer stack inserted into a housing, wherein the layer stack folded loosely into the holding device is compressed by a compression element.
Figure 4C:
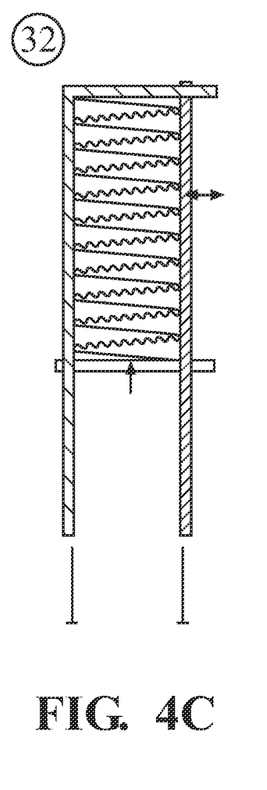
FIG. 4C is a third process step of a process for producing a layer stack inserted into a housing, wherein the layer stack folded loosely into the holding device is compressed by a compression element.
Figure 4D:
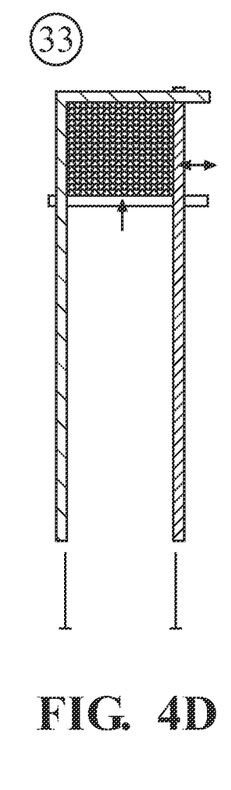
FIG. 4D is a fourth process step of a process for producing a layer stack inserted into a housing, wherein the layer stack folded loosely into the holding device is compressed by a compression element.
Figure 4E:
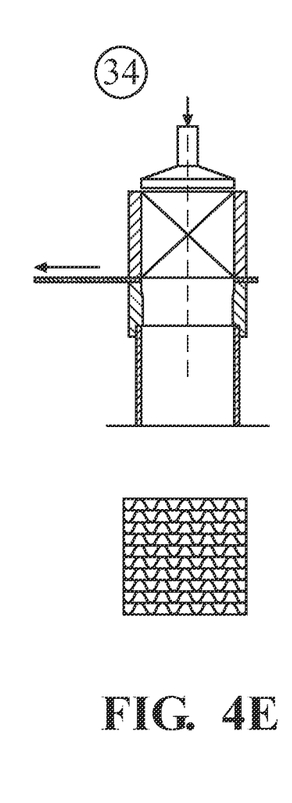
FIG. 4E is a fifth process step of a process for producing a layer stack inserted into a housing, wherein the layer stack folded loosely into the holding device is compressed by a compression element.
Figure 5A:
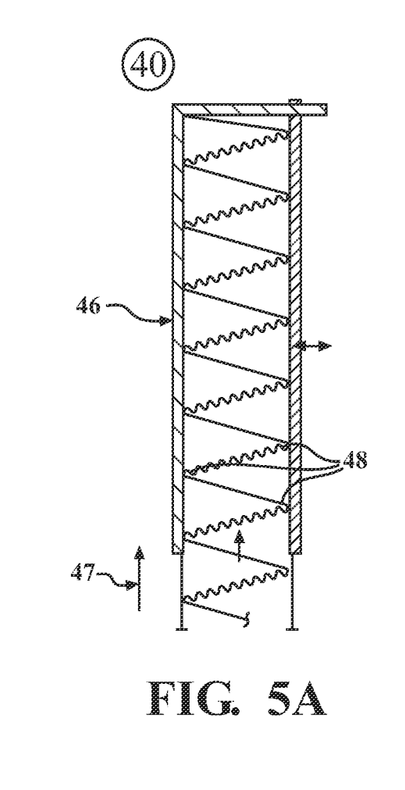
FIG. 5A shows a first process step of a process for producing a layer stack inserted into a housing, wherein shaped elements and/or guide elements are inserted into the folding regions.
Figure 5B:
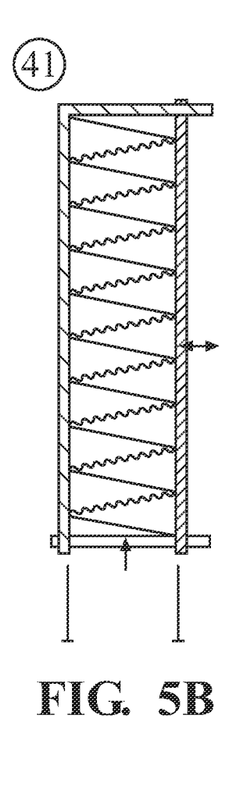
FIG. 5B is a second process step of a process for producing a layer stack inserted into a housing, wherein shaped elements and/or guide elements are inserted into the folding regions.
Figure 5C:
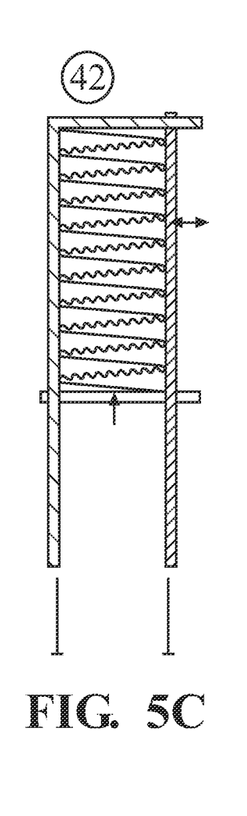
FIG. 5C is a third process step of a process for producing a layer stack inserted into a housing, wherein shaped elements and/or guide elements are inserted into the folding regions.
Figure 5D:
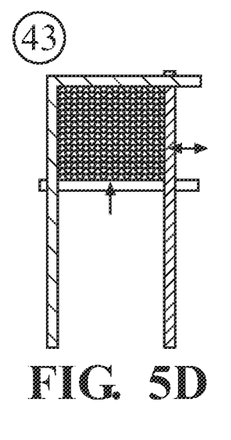
FIG. 5D is a fourth process step of a process for producing a layer stack inserted into a housing, wherein shaped elements and/or guide elements are inserted into the folding regions.
Figure 5E:
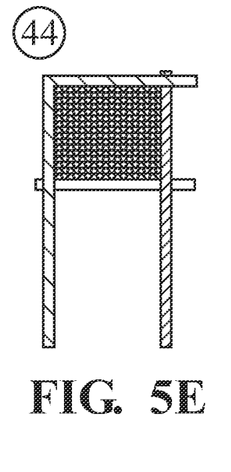
FIG. 5E is a fifth process step of a process for producing a layer stack inserted into a housing, wherein shaped elements and/or guide elements are inserted into the folding regions.
Figure 5F:
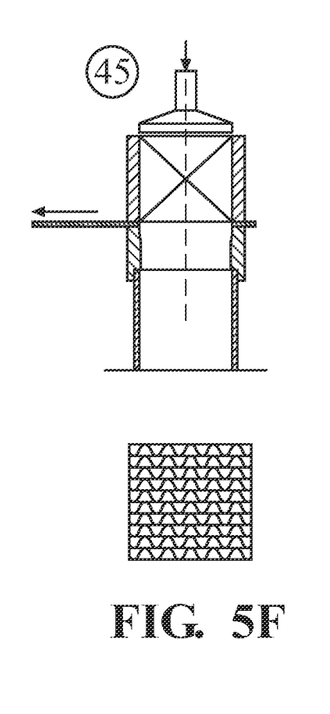
FIG. 5F is a sixth process step of a process for producing a layer stack inserted into a housing, wherein shaped elements and/or guide elements are inserted into the folding regions.

To compress the layer stack, a compression element 36 is used in step 31 to compress the sections loosely folded into the holding device 35, ensuring that they come to rest fully on one another.

For this purpose, the compression element 36 is formed by a plate or a ram, for example. The compression element 36 is introduced into the holding device through the opening of the holding device 35 through which the sections of the metal strip are also folded in. Here, the force acting on the sections is at least sufficient to ensure that the sections are folded fully onto one another. However, the force is preferably sufficiently small to ensure that the corrugated sections are not unintentionally deformed.

The progressive compression is illustrated in steps 32 and 33. Once the fully compressed layer stack has been produced, as shown in step 33, it is inserted into a housing in order to form a honeycomb body. The layer stack may already be brazed before insertion into the housing or, alternatively, only afterwards. This increases stability. The insertion of the layer stack from the holding device into the housing has already been shown in FIGS. 2A-2F and corresponds to this.

FIGS. 5A-5F show process steps 40 to 45 of a method slightly modified in comparison with the method in FIGS. 4A-4E. In addition to the procedure already described in FIGS. 4A-4E, guide elements 48 are now inserted in process step 40 into the folding regions formed during the folding over of the individual sections, and these guide elements are then furthermore used to convey the individual layers into the holding device 46 along the main feed direction 47. For this purpose, the guide elements 48 are mounted so as to be movable along the main feed direction. In the example in FIGS. 5A-5F, a respective guide element 48 engages in a folding region 49. In alternative embodiments, it is also possible for individual folding regions to remain free.

The guide elements 48 are introduced into the layer stack in a direction transverse to the main feed direction 48, in the example in FIGS. 5A-5F along a surface normal to the plane of the drawing. The guide elements 48 are formed by rod-shaped elements, for example, which preferably have a shape which is matched to the corrugation of the corrugated sections of the metal strip or to the desired shape of the folding region in the finished compressed layer stack.

In steps 41 and 42, it is seen how the layer stack is compressed by the acceptance of the compression element along the main feed direction 47. In step 44, the guide elements 48 are pulled out of the layer stack again, thereby giving rise to the finished layer stack. The layer stack is then inserted in the brazed or unbrazed state into a housing provided, in a manner similar to FIGS. 4A-4E.

Figure 6A:
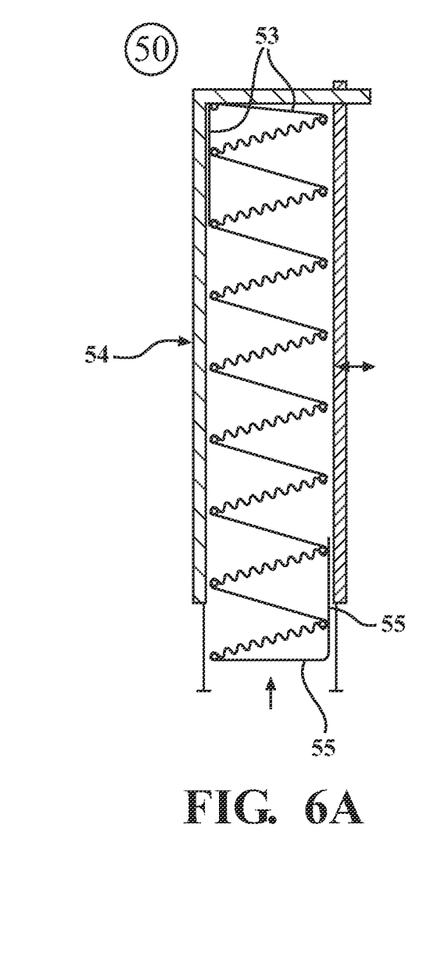
FIG. 6A is a first process step of a process for producing a honeycomb body, wherein in each case the first and the last section folded into the holding device have a longer extent than the other sections.
Figure 6B:
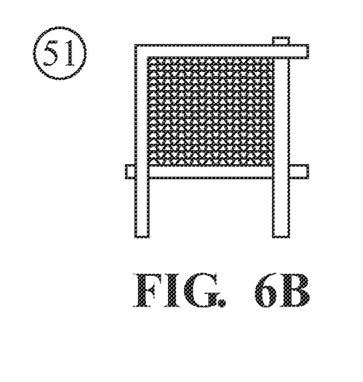
FIG. 6B is a second process step of a process for producing a honeycomb body, wherein in each case the first and the last section folded into the holding device have a longer extent than the other sections.
Figure 6C:
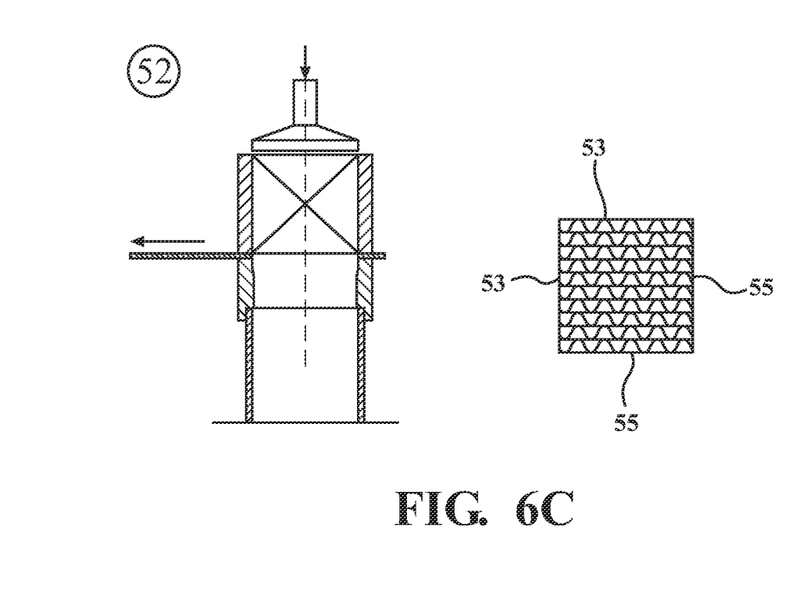
FIG. 6C is a third process step of a process for producing a honeycomb body, wherein in each case the first and the last section folded into the holding device have a longer extent than the other sections.

FIGS. 6A-6C show another modification of the method according to the invention. As an addition to the steps already described above, the first and the last section of the metal strip have a different configuration in the method according to FIGS. 6A-6C. In step 50, it is seen that both the first section 53, which has been folded into the holding device 54, and the last section 55 have a significantly longer extent than the other sections.

All the sections preferably have an extent which corresponds to the internal width of the holding device 54. However, sections 53 and 55 have an additional region, as a result of which they have a longer extent than the other sections. The additional region of the sections 53, 55, which projects in comparison with the other sections, is additionally folded once and in each case placed against one of the inner walls of the holding device 54. This ensures that the finished compressed layer stack is completely enclosed by the respective first section 53 and the respective last section 55 laterally in a direction transverse to the flow ducts formed in the layer stack. The two sections 53, 55 thus form a housing which encloses the remainder of the layer stack, which, as in the previous examples, is likewise formed by corrugated sections and uncorrugated sections folded alternately onto one another.

Depending on the length of the sections 53, 55 or of the additional regions, the layer stack is fully enclosed or, alternatively, only partially. Like the layer stacks in the previous Figures, the layer stack may likewise be inserted in the brazed or unbrazed state into another housing in order to achieve increased stability.

In the case of FIGS. 6A-6C, the layer stack produced has a square cross section, and therefore the regions of the sections 53, 55 which form the top or bottom end of the layer stack are of the same length as the additional regions of the sections, which delimit the layer stack on the right and the left. The length of the sections 53, 55 and, in particular, of the additional folded additional regions for contact with the lateral outer edges of the layer stack is adapted to match the respective layer stack to be produced.

In the case of a rectangular layer stack, the region of the sections 53, 55 which delimits the layer stack at the top and the bottom is preferably angled at 90 degrees to the additional regions enclosing the layer stack on the right and on the left. In a preferred embodiment, the sections 53, 55 may also be manufactured from a thicker material or are formed in double layers by a preceding folding operation in order to create increased stability for the layer stack.

By means of a method as shown in FIGS. 6A-6C, the metal strip which is provided to form the layer stack may also be used to create an integral matching housing in order to produce the layer stack, including a housing, from just one material in one process.

The exemplary embodiments in the Figures are in particular not of a limiting nature and serve for illustrating the concept of the invention. The individual features of the embodiments may be combined with one another.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for producing a honeycomb body for a catalytic converter for treating exhaust gases, comprising the steps of:
   providing a plurality of flow ducts, through which gas flows from an inlet end to an outlet end;
   providing a plurality of metal layers lying on top of one another;
   providing a housing;
   providing a metal strip;
   providing a holding device;
   forming a plurality of corrugated sections in the metal strip, such that each of the plurality of corrugated sections are adjacent to one another;
   creating a pre-bend of the metal strip in the end region of each of the plurality of corrugated sections;
   folding the plurality of corrugated sections of the metal strip onto one another and into the holding device such that the individual corrugated sections are alternately folded onto one another in opposite directions, creating a layer stack within the holding device;
inserting the layer stack into the housing by moving the layer stack from the holding device to the housing; and
joining the layer stack to the housing in contact regions between the layer stack and the housing.

2. The method of claim 1, further comprising the steps of:
providing a plurality of smooth sections being part of the metal strip;
forming the plurality of corrugated sections in the metal strip such that each of the plurality of smooth sections is located between two of the plurality of corrugated sections.

3. The method of claim 1, further comprising the steps of:
bonding the layer stack to the housing in contact regions between the layer stack and the housing.

4. The method of claim 1, further comprising the steps of:
mechanically joining the layer stack to the housing in contact regions between the layer stack and the housing.

5. The method of claim 1, further comprising the steps of:
providing a plurality of lever elements which are rotatably mounted on opposite sides of the holding device;
using the plurality of lever elements to fold the plurality of corrugated sections into the holding device by lever elements.

6. The method of claim 5, further comprising the steps of pulling one of the plurality of lever elements out of the layer stack after one of the layers of the layer stack has been produced by folding in one of the plurality of corrugated sections of the metal strip.

7. The method of claim 5, further comprising the steps of using the lever elements to produce a movement along the main feed direction of the metal strip, such that the layer stack produced is fed into the holding device.

8. The method of claim 5, further comprising the steps of folding the corrugated sections against a plate arranged in the holding device, such that the plate is acted upon by a preloading force opposite to the main feed direction of the metal strip.

9. The method of claim 8, further comprising the steps of moving the lever elements along the main feed direction of the metal strip and transversely to the main feed direction of the metal strip.

10. The method of claim 8, further comprising the steps of moving the lever elements along the main feed direction of the metal strip or transversely to the main feed direction of the metal strip.

11. The method of claim 1, further comprising the steps of: rotatably mounting the holding device;
folding the sections of the metal strip onto one another in the manner of an accordion transversely to the main feed direction of the metal strip as the holding device is rotated.

12. The method of claim 11, further comprising the steps of folding the sections of the metal strip onto one another in the manner of an accordion by alternate rotation of the holding device.

13. The method of claim 12, further comprising the steps of:
providing a holding plate on the side facing away from the holding device;
forming a layer of the layer stack by fixing one of the plurality of corrugated sections with the holding plate.

14. The method of claim 13, further comprising the steps of:
providing a second holding plate;
removing the holding plate from the layer stack after the holding device has been rotated an additional layer from the layer stack has been created from one of the plurality of corrugated sections;
fixing the additional layer from the layer stack using the second holding plate.

15. The method of claim 1, further comprising the steps of: providing a compression element;
folding sections of the metal strip into the holding device by the feed motion of the metal strip until a predetermined number of sections has been folded onto one another in the holding device, such that the layer stack is formed;
compressing the layer stack by moving the compression element along the main feed direction.

16. The method of claim 15, further comprising the steps of:
providing a shaped element;
placing the shaped element in a folding region produced between two of the plurality of corrugated sections which are adjacent to one another by folding two of the plurality of corrugated sections onto one another, such that the shape of the folding region corresponds to the shape of the shaped element during compression of the layer stack.

17. The method of claim 16, further comprising the steps of:
providing a plurality of guide elements;
introducing at least one of the plurality of guide elements into the folding region produced by the folding of two of the plurality of corrugated sections which are adjacent to one another, such that one or more of the plurality of guide elements are movable along the main feed direction and guide the each of the plurality of corrugated sections folded onto one another in the holding device.

18. The method of claim 1, further comprising the steps of: providing a first section of the metal strip being a first smooth section which is longer than each of the plurality of corrugated sections of the metal strip, such that the first section has a first additional region;
providing a last section of the metal strip being a second smooth section which is longer than each of the plurality of corrugated sections of the metal strip, such that the last section has a second additional region;
folding the first section and the last section into the holding device such a way that the first additional region and the second additional region rest against the inner surfaces of the holding device along the main feed direction and space apart the layer stack produced at least partially from the holding device.

19. The method of claim 1, further comprising the steps of providing the metal strip to be at least sufficiently long enough to enable at least one complete honeycomb body to be formed in one piece.

20. The method of claim 1, further comprising the steps of:
forming the plurality of corrugated sections from the metal strip in directly successive steps;
pre-bending each of the plurality of corrugated sections to a desired length, such that each pre-bend is formed between each of the plurality of corrugated sections;
folding the plurality of corrugated sections around each pre-bend to form the layer stack.

21. The method of claim 1, further comprising the steps of:

providing a plurality of rams;
forming each pre-bend by driving each of the plurality of rams into the metal strip.

22. The method of claim 1, further comprising the steps of:
providing a plurality of profiled rolls;
forming the plurality of corrugated sections by rolling the plurality of profiled rolls into the metal strip.

23. The method of claim 1, further comprising the steps of folding the sections of the metal strip onto one another in opposite directions in the manner of an accordion transversely to the main feed direction of the metal strip.

* * * * *